United States Patent
Abe et al.

(10) Patent No.: US 6,429,781 B2
(45) Date of Patent: Aug. 6, 2002

(54) AXIAL BEARING WEAR DETECTOR DEVICE FOR CANNED MOTOR

(75) Inventors: Masaru Abe, Himeji; Hisashi Misato, Hyogo; Takashi Nii, Tatsuno, all of (JP)

(73) Assignee: Kabushiki Kaisha Teikoku Denki Seisakusho, Hyogo (JP)

( * ) Notice: Subject to any disclaimer, the term of this patent is extended or adjusted under 35 U.S.C. 154(b) by 0 days.

(21) Appl. No.: 09/782,657

(22) Filed: Feb. 13, 2001

(30) Foreign Application Priority Data

Feb. 14, 2000 (JP) ........................................ 2000-035751

(51) Int. Cl.[7] .............................................. G08B 21/00
(52) U.S. Cl. ............... 340/686.3; 340/682; 340/815.58; 324/207.16; 324/207.17
(58) Field of Search ................................. 340/682, 679, 340/686.3, 815.45, 815.58; 324/207.15, 207.16, 207.17, 207.18, 207.2, 207.22, 207.23; 318/647

(56) References Cited

U.S. PATENT DOCUMENTS

| 4,211,973 A | * | 7/1980 | Sato et al. ................... 324/772 |
| 5,926,001 A | * | 7/1999 | Eguchi ........................ 318/647 |
| 5,955,880 A | * | 9/1999 | Beam et al. ............ 324/207.17 |
| 6,107,794 A | * | 8/2000 | Kipp et al. ............. 324/207.23 |

* cited by examiner

Primary Examiner—Van Trieu
(74) Attorney, Agent, or Firm—Darby & Darby

(57) ABSTRACT

Axial bearing wear in a motor is determined by differencing signals from special coils in the two ends of the motor stator. The signals on the two coils vary in opposite directions with axial displacement of the motor rotor. A dead zone circuit suppresses output when the axial displacement of the rotor is within the normal range of play for the rotor of the particular motor. When the axial displacement exceeds the normal range, the output actuates an indicator in relation to the magnitude of the displacement in excess of the normal range. Sequential LED indicators indicate both magnitude and direction of excess displacement. An analog meter is also disclosed which indicates only the magnitude of the excess displacement.

3 Claims, 7 Drawing Sheets

AXIAL BEARING WEAR DETECTOR DEVICE FOR CANNED MOTOR

BACKGROUND OF THE INVENTION

The present invention relates to an axial bearing wear detector device for detecting axial bearing wear in canned motors.

In general, canned motors are employed mainly for driving pumps and used for chemical plants. Therefore high reliability is required of the canned motors.

In canned motor pumps, the canned motor and the pump constitute monoblock construction to prevent the leakage of the fluid, thus making it impossible to monitor the inner conditions visually. In most cases, the rotor of the canned motor for rotatably driving the impeller of the pump is journaled by a slide bearing which is lubricated with a pump fluid. To operate the canned motor efficiently, it is necessary to monitor the condition of slide bearing wear from outside.

Accordingly, axial bearing wear detector devices were suggested, for example, in Japanese Patent Publication No. 21924 of 1982, and Japanese Patent Laid-Open Publication Nos. 80103 of 1998 and 148819 of 1999. The devices suggested therein are adapted to have axial detection coils provided on the both axial end portions of the stator of a canned motor. Voltages induced in these axial detection coils are compared to detect the axial position of the rotor to be rotatably journaled by slide bearings, thereby allowing the amount of bearing wear to be estimated based on the axial position of the rotor.

Conventional canned motor axial bearing wear detector devices were adapted to estimate the amount of bearing wear based on the axial position of the rotor. However, the rotor journaled by slide bearings has axial play and thus may be displaced in the axial direction depending on the condition of the load even without axial wear occurring on the slide bearings. This made it impossible to clearly determine whether or not the rotor was displaced because wear had occurred on the slide bearings.

OBJECTS AND SUMMARY OF THE INVENTION

In order to solve the problems, the object of the present invention is to provide a canned motor axial bearing wear detector device which clearly indicates the axial wear of the bearings taking the normal axial play of the rotor into account. The canned motor axial bearing wear detector device can also indicate clearly in which axial direction and how excessively the wear has occurred.

The canned motor axial bearing wear detector device according to the invention comprises axial detection coils on a canned motor having a stator and a rotor at both axial ends of the stator. A differential amplifier circuit amplifies differentially a rectified and smoothed voltage induced in the axial detection coils outputs a positive or negative voltage signal in response to a direction and position of axial displacement of the rotor relative to the stator. A dead zone circuit and a reference signal generator circuit output a reference signal. An axial wear indicator indicates a degree of bearing wear in an axial direction of the canned motor in response to the signal output from the comparator circuits of the dead zone circuit. Here, the dead zone circuit includes a polarity inverting circuit for inverting positive and negative voltage signals output from the differential amplifier circuit. A first comparator circuit outputs a signal in response to an amplitude of a voltage signal when the voltage signal output from the polarity inverting circuit is greater than the reference signal output from the reference signal generator circuit. A second comparator circuit outputs a signal in response to an amplitude of a voltage signal when the voltage signal output from the differential amplifier circuit is greater than the reference signal output from the reference signal generator circuit.

In this axial bearing wear detector device, axial displacement of the rotor causes a change in voltage induced in the axial detection coils on both axial ends of the stator. The differential amplifier circuit amplifies differentially a rectified and smoothed voltage induced in the axial detection coils and outputs a positive or negative voltage signal in response to the direction and position of axial displacement of the rotor relative to the stator. The dead zone circuit allows the polarity inverting circuit to invert positive and negative voltage signals from the differential amplifier circuit. The first comparator circuit outputs a signal in response to the amplitude of the voltage signal when the voltage signal output from the polarity inverting circuit is greater than the reference signal output from the reference signal generator circuit. The second comparator circuit outputs a signal in response to the amplitude of the voltage signal when the voltage signal output from the differential amplifier circuit is greater than the reference signal output from the reference signal generator circuit. That is, the amplitude of the reference signal from the reference signal generator circuit is set to a value that is approximately equal to the signal range resulting from normal axial play. When the signal is in the axial-play range, neither of the comparator circuits outputs signals representing axial wear. In this event, only the center position indicator is energized. As axial wear occurs, the signal from the output terminal exceeds the allowed value of axial play. The axial wear indicator then indicates the amount and direction of axial bearing wear of the canned motor in response to the signal output from the comparator circuits of the dead zone circuit. Thus, the dead zone circuit allows the wear indicators to remain unlit for the axial displacement of the rotor corresponding to the play of the rotor and to be lit only for axial displacement of the rotor caused by bearing wear. Therefore, it is possible to determine whether the axial displacement of the rotor is within the range of play or whether the axial displacement is due to bearing wear and clearly indicates axial wear of the bearings.

The canned motor axial bearing wear detector device according to a further embodiment of the invention includes a wear indicator that comprises a first axial wear indicator for indicating a degree of bearing wear in an axial direction of the canned motor in response to the signal output from one of the comparator circuits of the dead zone circuit. The axial indicator also comprises a second axial wear indicator for indicating a degree of bearing wear in the axial direction of the canned motor in response to the signal output from the other one of the comparator circuits of the dead zone circuit.

As mentioned above, the first and second wear indicators are employed as the axial wear indicator. This makes it possible to determine the amount and the direction of axial displacement of the rotor caused by bearing wear and to clearly indicate in which direction and how excessively the wear has occurred.

The canned motor axial bearing wear detector device includes the first and second axial wear indicator with an LED sequential bar graph. The number of LEDs on the LED bar graph to be lit is varied in response to the signal output from each of the comparator circuits of the dead zone circuit.

The number of illuminated LEDs is varied in response to the amplitude of the signal output from each of the comparator circuits of the dead zone circuit. This clearly indicates not only the magnitude of the wear, but also the direction of the wear.

DETAILED DESCRIPTION OF THE PREFERRED EMBODIMENT

Figure 3:
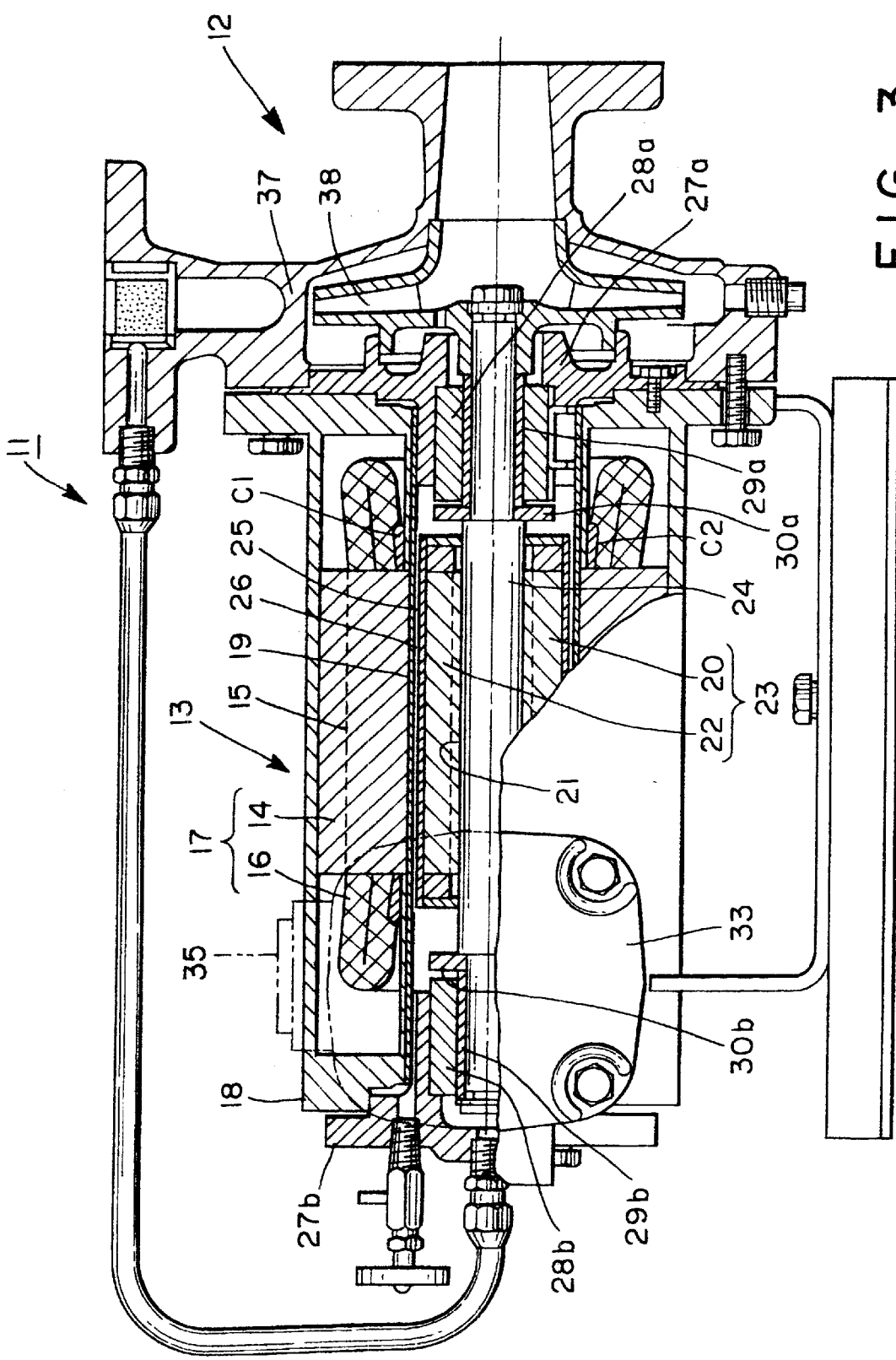
FIG. 3 is a partially cut away front view illustrating a radial gap type canned motor pump incorporating the axial bearing wear detector device, for use in canned motors, according to the embodiment of the present invention.

Referring to FIG. 3, a canned motor pump, shown generally denoted at 11, includes a pump 12 and a radial gap canned motor 13, which are integrated with each other in a fluid-tight manner.

A stator 17 in the canned motor 13 includes stator iron core 14 in a stator frame 18. A stator winding 16 is wound in a stator groove 15 of the stator iron core 14. A stator can 19 is tightly held in the inner peripheral surface of the stator 17. Both end rims of the stator can 19 are welded to the stator frame 18 in a fluid-tight manner. The stator can 19 is made in a thin cylindrical shape of a non-magnetic substance such as stainless steel.

A rotor shaft 24 is fixed in a rotor 23. A rotor iron core includes a rotor groove 21 containing a rotor conductor 22. A rotor can 25 covers the outer peripheral surface of the rotor 23. The rotor can 25 is made in a thin cylindrical shape of a non-magnetic substance such as stainless steel. The rotor can 25 of the rotor 23 is spaced inward from the stator can 19 by a can gap 26 therebetween.

The rotor shaft 24 is journaled at bearings (slide bearings) 28a, 28b mounted in bearing boxes 27a, 27b via sleeves 29a, 29b. Thrust collars 30a, 30b limit the axial displacement of rotor shaft 24.

The stator iron core 14 includes a pair of radial detection coils C1, C2 angularly spaced apart about the axis of the stator iron core 14 by a spatial angle of 180 degrees relative to the center of the shaft of the stator iron core 14. The radial detection coils C1, C2 are wound onto the whole tooth portion of the stator iron core 14.

A terminal box 33 protrudes from the canned motor 13. The terminal box 33 is in communication with the interior of the stator frame 18. The upper portion of the terminal box 33 includes a sealed container 35 having a transparent peephole (not shown) formed of glass with explosion-proof configuration. Part of the axial bearing wear detector device is accommodated inside the sealed container 35, which is included in an operation monitor device for the canned motor 13.

A casing 37 of the pump 12 is mounted in a fluid-tight manner to the end of the stator frame 18 of the canned motor 13. An impeller 38 is affixed to the rotor shaft 24 inside the casing 37. The impeller 38 inside the pump 12 is rotatably driven by the rotor 23 supported on the bearings 28a, 28b via the sleeves 29a, 29b. Axial displacement of the impeller 38 is limited by the thrust collars 30a, 30b and the bearings 28a, 28b.

Figure 4:
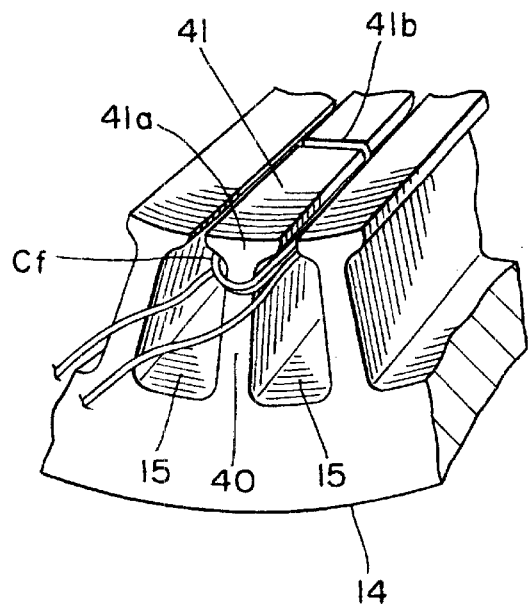
FIG. 4 is a perspective partial view illustrating the axial detection coils, mounted on the end portion of a tooth portion of the stator, according to the embodiment of the present invention.

Referring now to FIG. 4, a front axial detection coil Cf, and a rear axial detection coil Cr (only front axial detection coil Cf is shown in FIG. 4) are mounted on end portions of a tooth portion of the stator iron core 14. A notched groove 41b near an end portion 41a of a tooth portion 40 of the stator iron core 14 form a small core portion 41 about which front axial detection coil Cf is wound. One axial detection coil Cf is wound in the stator groove 15 around the core portion 41. Although not shown in FIG. 4, the other axial detection coil Cr is wound on the opposite end of the tooth portion 40 in the same manner.

Figure 5:
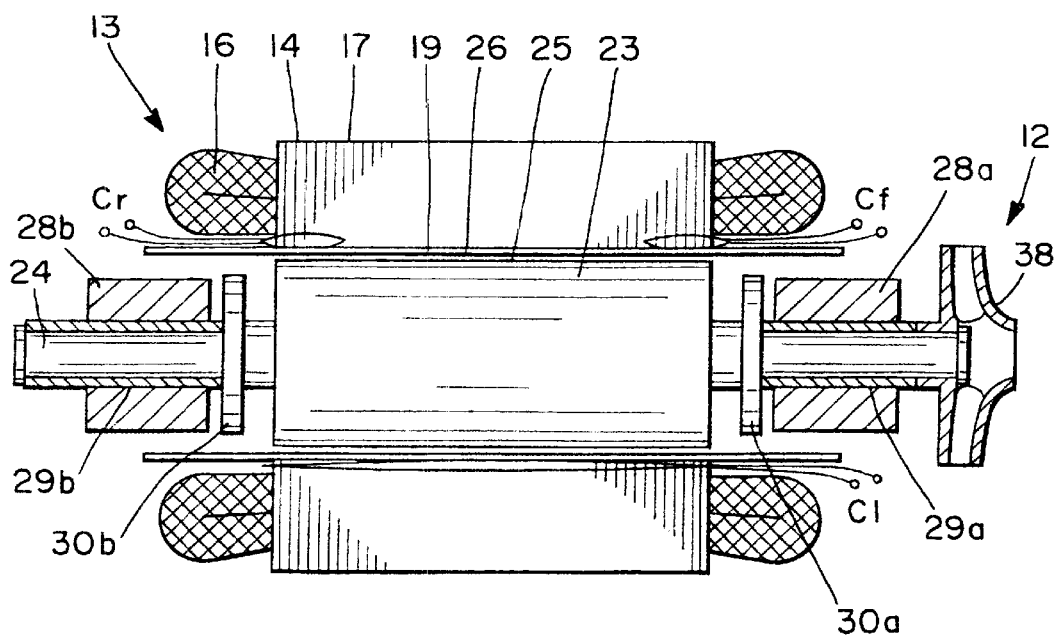
FIG. 5 is a schematic diagram of the canned motor pump.

Referring now to FIG. 5, the front and rear axial detection coils Cf and Cr are shown on the axial end portions above the stator iron core 14 of the canned motor 13. The axial detection coils Cf, Cr detect axial wear of the bearings 28a, 28b through detection of the axial position of the rotor 23. The radial detection coil C1, on a lower tooth portion, detects radial wear of the bearings 28a, 28b. The radial detection coil C2 (not shown in FIG. 5) is wound on a tooth portion opposite the position of radial detection coil C1. The radial detection coils C1 and C2 are connected in series, as will be detailed hereinafter.

In the following description, it is to be understood that the pump 12 side of the canned motor 13 is referred to as the front side (front portion side), whereas the opposite side to the pump 12 is referred to as the rear side (rear portion side).

The following explains how axial wear of the bearings 28a, 28b is detected.

Axial displacement of the rotor 23 toward the front side is limited by contact between the bearing 28a and the thrust collar 30a at the front side where the impeller 38 is located. Rearward movement of the rotor 23 is limited by contact between the bearing 28b and the thrust collar 30b.

Axial play of the rotor 23 or the range over which the rotor 23 can move freely in the axial direction thereof, in the absence of axial wear of the bearings 28a, 28b, depends on the size and structure of the pump 12. However, axial play is generally within a range from approximately 0.5 to 3 mm with the allowable axial wear limit of the front side bearing 28a and the rear side bearing 28b being approximately 1 mm.

Under normal operation, the rotor 23 sits in its axial direction at a position where the front side bearing 28a and the thrust collar 30a rotate in contact with each other, or where the rear side bearing 28b and the thrust collar 30b rotate in contact with each other. However, when the amount of axial wear of bearings 28a, 28b exceeds approximately 1 mm, the front or rear surface of the impeller 38 of the pump 12 can contact the casing 37 or the bearing box 27a.

Thus, considering the foregoing, the axial displacement of the rotor 23 must be monitored within the range of approximately ±2.5 mm to detect excessive axial wear of the bearings 28a, 28b.

The axial detection coils Cf, Cr, on both end portions of the stator iron core 14 detect axial displacement of the rotor 23 by a difference in voltage induced in the axial detection coils Cf, Cr.

Figure 6:
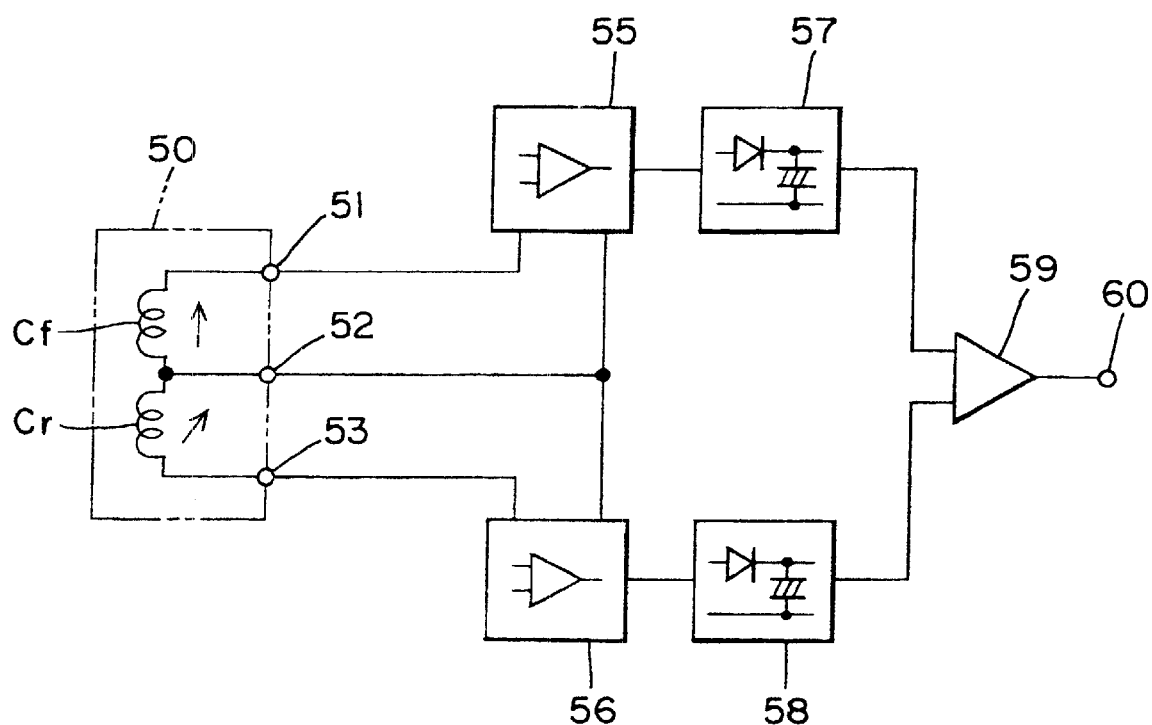
FIG. 6 is a circuit diagram illustrating the axial wear detector portion and the differential amplifier circuit according to the embodiment of the present invention.

Referring now to FIG. 6, an axial wear detector portion 50 includes the axial detection coils Cf, Cr, described above, on the opposed ends of the stator iron core 14. Output terminals 51, 52 of the front side axial detection coil Cf are connected to one input of a differential amplifier circuit 59 via an amplifier circuit 55 and a rectifier smoothing circuit 57. Output terminals 52, 53 of the rear side axial detection coil Cr are connected to the other input of the differential amplifier circuit 59 via the amplifier circuit 56 and the rectifier smoothing circuit 58. The output of the differential amplifier circuit 59 is connected to an output terminal 60.

Figure 7:
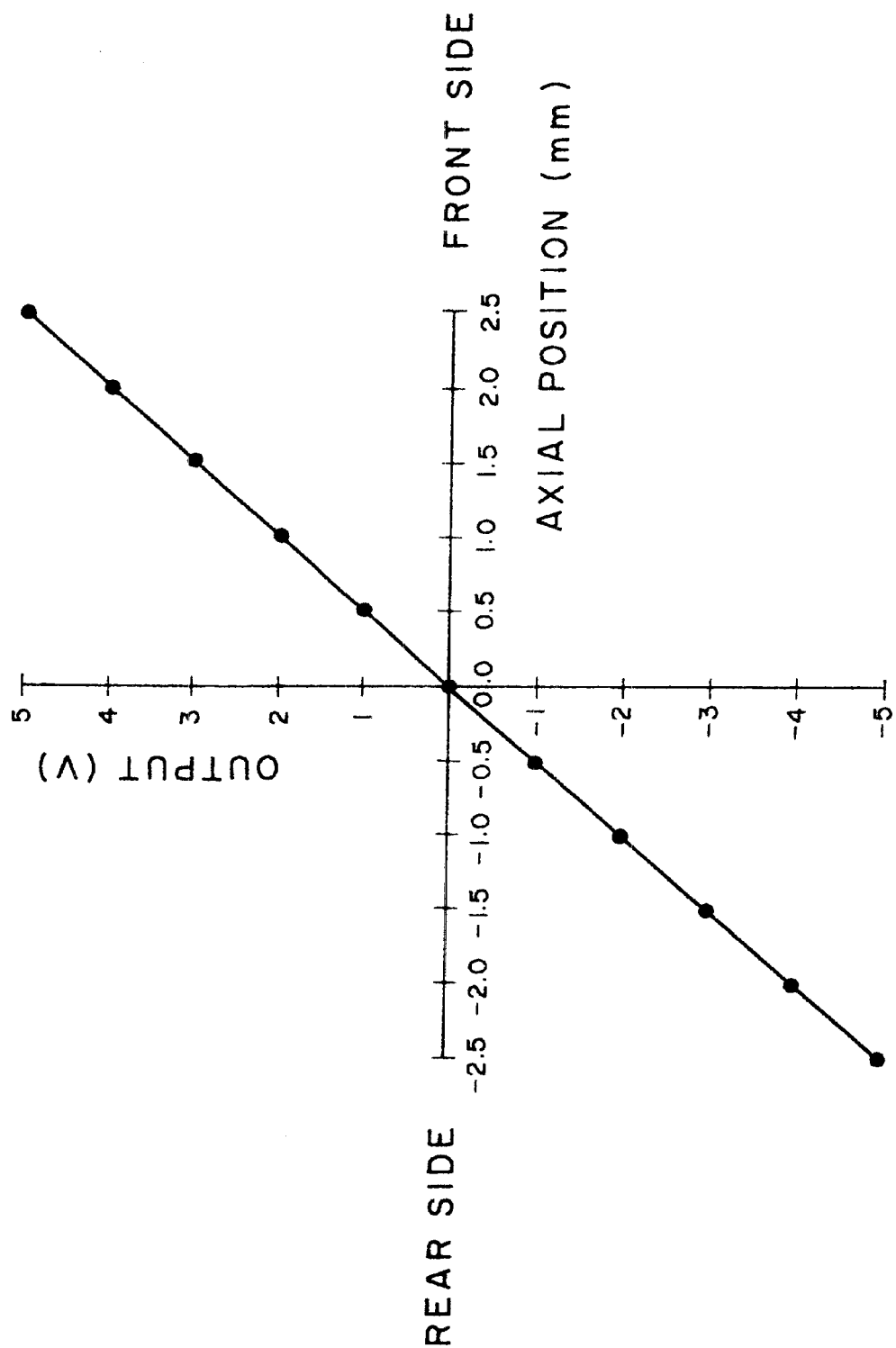
FIG. 7 is a graphical representation of a voltage signal to be outputted from the differential amplifier circuit in response to the axial position of the rotor according to the embodiment of the present invention.

Referring now to FIG. 7, voltage signal outputted from the differential amplifier circuit 59 in response to the axial position of the rotor 23 is shown. In the figure, the horizontal axis represents the axial position of the rotor 23 journaled by the bearings 28a, 28b, relative to a center position, and the vertical axis represents the output voltage from the output terminal 60 of the differential amplifier circuit 59.

The relationship between the position of the rotor 23 and the output of the voltage signal is independent of the axial play of the rotor 23 and the axial wear of the bearings 28a, 28b but is dependent on the position of the rotor 23 relative to the stator 17.

A change in axial position of the rotor 23 relative to the stator 17 causes a change in the distribution of magnetic flux between the stator 17 and the rotor 23. The change in the distribution of magnetic flux appears as a change in amplitude of the voltage signals induced in the axial detection coils Cf, Cr on opposite ends of the stator 17. Thus, the difference between the outputs of the axial detection coils Cf, Cr provides a voltage signal responsive to the axial position of the rotor 23 with the common change being eliminated.

In the example shown in FIG. 7, the output terminal 60 provides a voltage signal of 0V when the rotor 23 is located at the center of the axial play thereof. A positive (+) voltage signal is outputted when the rotor 23 is located closer to the front side from the center of the play and a negative (−) voltage signal is outputted when the rotor 23 is located closer to the rear side from the center.

Figure 1:
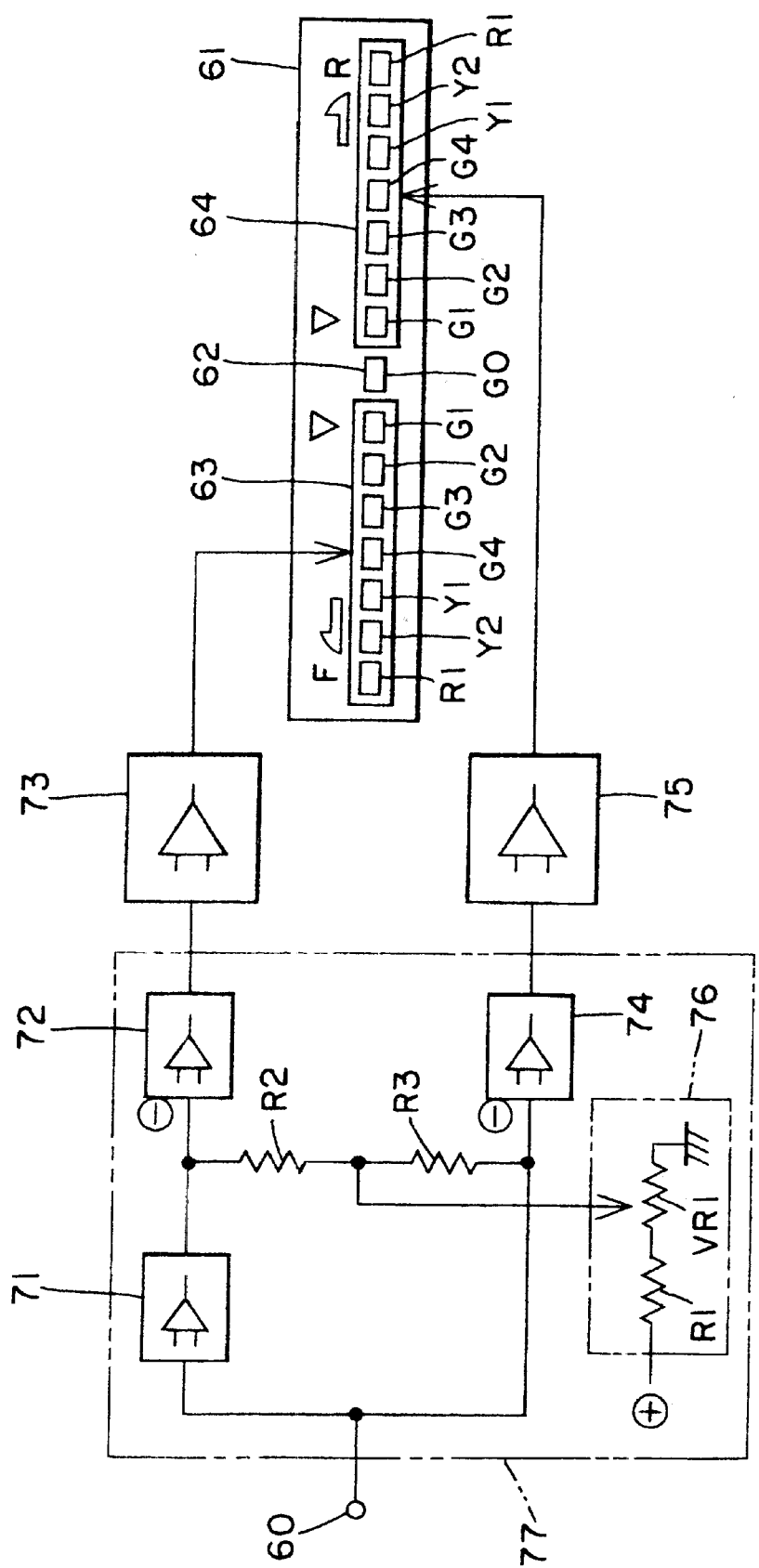
FIG. 1 is a circuit diagram illustrating a dead zone circuit and an axial wear indicator of an axial bearing wear detector device for use in canned motors according to an embodiment of the present invention.

Referring now to FIG. 1, an axial wear indicator 61 energizes a sequential LED (light emitting diode) bar graph having a center position indicator 62, a front side wear indicator 63, and a rear side wear indicator 64. The center position indicator 62 is located at the center of the LED bar graph. The front side wear indicator 63 is located to the left of the center position indicator 62 where it functions as a first axial wear indicator. The rear side wear indicator 64 is located to the right of the center position indicator 62 where it functions as a second axial wear indicator.

The center position indicator 62 has a green LED G0 that is always lit. The front and rear side wear indicators 63, 64 each have a LED bar graph with a green LED G1, LED G2, LED G3, and LED G4, a yellow LED Y1 and LED Y2, a red LED R1, arranged in that order from the center to outside. The LEDs of the LED bar graph are lit sequentially from the center to outside in either direction in response to the frontward or rearward displacement of the rotor 23 caused by bearing wear, thereby indicating the state of axial bearing wear.

The transmission path for the positive and negative voltage signal from the output terminal 60 is divided into two systems. This is done to allow each of the wear indicators 63, 64 to be lit in response to a positive or negative voltage signal outputted from the output terminal 60 of the differential amplifier circuit 59. One of the systems is connected with a polarity inverting circuit 71, a first comparator circuit 72, and a first LED driver circuit 73. The polarity inverting circuit 71 inverts the positive and negative polarities of the voltage signal from the output terminal 60. The first comparator circuit 72 outputs a signal in response to the amplitude of the voltage signal when the absolute value of the negative voltage signal outputted from the polarity inverting circuit 71 is greater than a reference signal. The first LED driver circuit 73 drives plurality of LEDs of the front side wear indicator 63 in accordance with the output from the first comparator circuit 72. The other system is connected with a second comparator circuit 74 and a second LED driver circuit 75, but without a polarity inverting circuit. The second comparator circuit 74 outputs a signal in accordance with the amplitude of the voltage signal when the absolute value of a negative signal from the output terminal 60 is greater than a reference voltage. The second LED driver circuit 75 drives LEDs of the rear side wear indicator 64 in accordance with the output from the second comparator circuit 74.

The reference signal inputted to each to the comparator circuits 72, 74 is produced by a reference signal generator circuit 76. The reference signal generator circuit 76 has a variable resistor VR1 to allow adjustment of the output voltage of the reference signal to be inputted to the input side via a resistor R1. The input side of each of the comparator circuits 72, 74 is connected to the output side of the variable resistor VR1 via resistors R2, R3, respectively.

The amplitude of the reference signal outputted from the reference signal generator circuit 76 is adjusted using the variable resistor VR1. The reference signal generator circuit 76, the comparator circuits 72, 74, and the polarity inverting circuit 71 constitute a dead zone circuit 77. The dead zone circuit 77 allows the wear indicators 63, 64 to remain unlit over a range of axial displacement of the rotor 23 corresponding to the play of the rotor 23. The wear indicators 63, 64 thus are lit only for in response to axial displacement of the rotor 23 in excess of the normal axial displacement caused by bearing wear.

Figure 2:
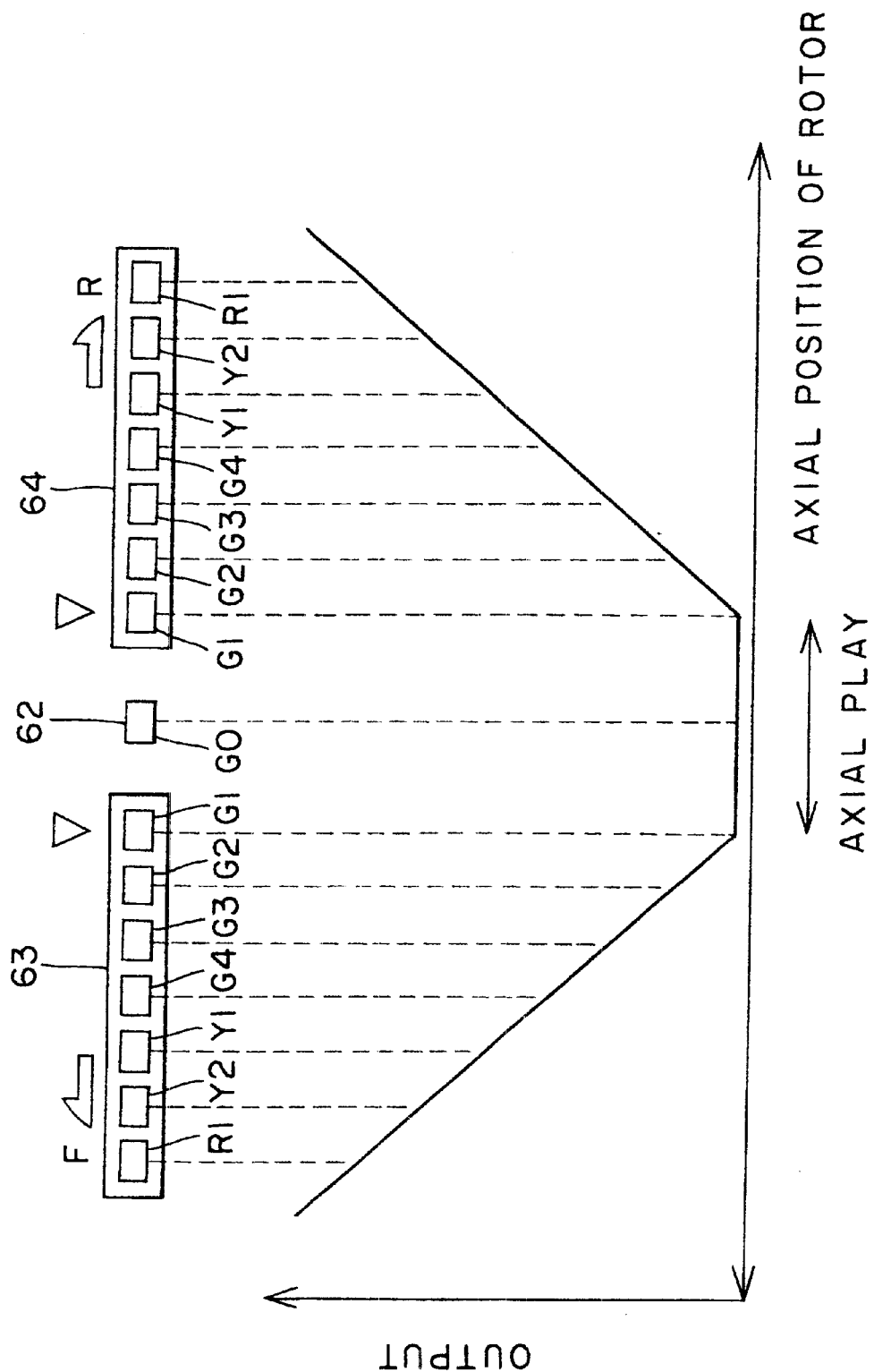
FIG. 2 is an explanatory view illustrating the relationship among the axial position of the rotor, the output voltage of the axial wear indicator, and the lighting of the axial wear indicator of the axial bearing wear detector device according to the embodiment of the present invention.

Referring now to FIG. 2, the relationship among the axial position of the rotor 23, the output voltage of the axial wear indicator 61, and the lighting of the axial wear indicator 61 is shown. Without axial wear in the bearings 28a, 28b, the dead zone circuit 77 allows the variable resistor VR1 of the reference signal generator circuit 76 to be adjusted as follows. That is, the green LED G1 of the front side wear indicator 63 is lit when the thrust collar 30a and the bearing 28a of the front side are brought into contact with each other. In addition, the green LED G1 of the rear side wear indicator 64 is lit when the thrust collar 30b and the bearing 28b of the rear side are brought into contact with each other. As axial wear of the front side bearing 28a increases, the LEDs G1, G2, G3, G4, Y1, Y2, and R1 of the front side wear indicator 63 are successively lit. As axial wear of the rear side bearing 28b increases, the LEDs G1, G2, G3, G4, Y1, Y2, and R1 of the rear side wear indicator 64 are successively lit.

When the bearing 28a wears excessively toward the front side, the output signal of the differential amplifier circuit 59 becomes positive and the input signal to the second comparator circuit 74 becomes positive, causing no output to be generated from the second comparator circuit 74. Conversely, the input signal to the first comparator circuit 72 is inverted by the polarity inverting circuit 71 to become negative. When the absolute value of the output signal from the polarity inverting circuit 71 becomes greater than the reference signal outputted from the reference signal generator circuit 76, a signal is outputted from the first comparator circuit 72. The first LED driver circuit 73 drives the front side wear indicator 63 to illuminate the LEDs G1, G2, G3, G4, Y1, Y2, and R1. The number of illuminated LEDs depends on the level of the output signal from the first comparator circuit 72.

That is, when the front side thrust collar 30a and the front side bearing 28a rotate in contact with each other, the green LED G1 of the front side wear indicator 63 is lit in addition to the green LED G0 located at the center. When bearing wear is excessive toward the front side, the green LED G2 of the front side wear indicator 63 is also lit. When the bearing wears more excessively toward the front side, the green LED G3, green LED G4, yellow LED Y1, yellow LED Y2, and red LED R1 are all. In this manner, the state of axial bearing wear of the front side is indicated.

When the bearing wears excessively toward the rear side, the output signal of the differential amplifier circuit 59 becomes negative and the input signal to the first comparator circuit 72 is inverted by the polarity inverting circuit 71 to become positive, causing no output to be generated from the first comparator circuit 72. On the other hand, the input signal to the second comparator circuit 74 becomes negative. Thus, when the absolute value of the output signal from the differential amplifier circuit 59 becomes greater than the reference signal outputted from the reference signal generator circuit 76, a signal is outputted from the second comparator circuit 74. The second LED driver circuit 75 drives the rear side wear indicator 64 to illuminate the LEDs G1, G2, G3, G4, Y1, Y2, and R1. The number of illuminated LEDs depends on the level of the output signal from the second comparator circuit 74.

That is, when the rear side thrust collar 30b and the rear side bearing 28b rotate in contact with each other, the green LED G1 of the rear side wear indicator 64 is lit in addition to the green LED G0 located at the center. When the bearing wears excessively toward the rear side, the green LED G2 of the rear side wear indicator 64 is also lit. When the bearing wears even more toward the rear side, the green LED G3, green LED G4, yellow LED Y1, yellow LED Y2, and red LED R1 are additionally lit. In this manner, the state of axial bearing wear of the rear side is indicated.

The dead zone circuit 77 allows the wear indicators 63, 64 to remain extinguished while the axial displacement of the rotor 23 corresponds to the normal axial play of the rotor 23, and to be lit only for the axial displacement of the rotor 23 caused by bearing wear. This makes it possible to determine whether the axial displacement of the rotor 23 is within the range of play or due to bearing wear. This makes it possible to clearly indicate the axial wear of the bearings 28a, 28b as well as in which axial direction the wear is directed and how excessive the wear is.

Furthermore, since the wear indicators 63, 64, the number of LEDs in the LED bar graph varied in response to the signal outputted from each of the comparator circuits 72, 74 of the dead zone circuit 77. This clearly indicates how much, and in which axial direction the wear has occurred.

The wear indicators 63, 64 can be formed easily at low cost using the LED bar graph. However, a liquid crystal display device may be used as the bar graph. Alternatively, without limiting the indicator to the bar graph, any indicator which can indicate the degree of bearing wear may be used to clearly indicate how excessively and in which axial direction the wear has occurred.

In addition, when the voltage induced by the axial detection coils Cf, Cr is comparatively high, the connection sequence of the amplifier circuits 55, 56 and the rectifier smoothing circuits 57, 58 may be reversed. Alternatively, the amplifier circuits 55, 56 may be omitted.

Figure 8:
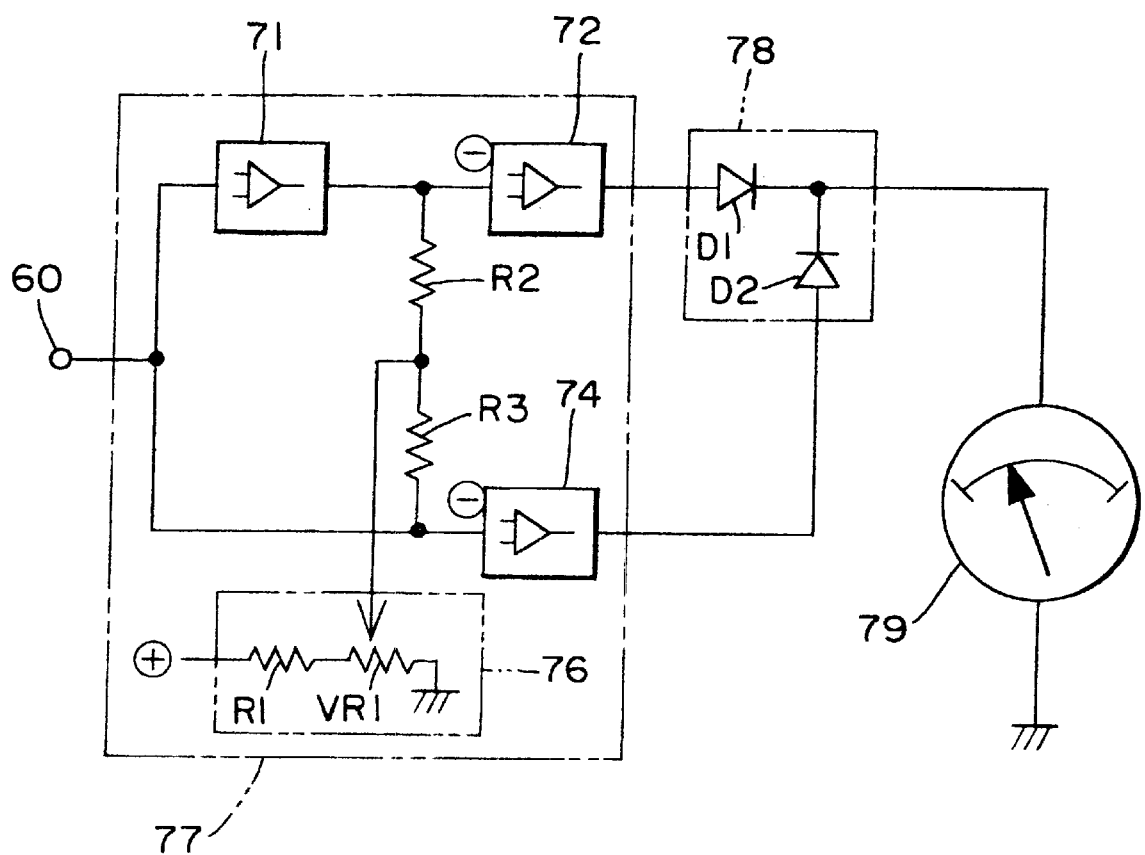
FIG. 8 is a circuit diagram illustrating a dead zone circuit and an axial wear indicator of an axial bearing wear detector device for use in canned motors according to another embodiment of the present invention.

Referring now to FIG. 8, an embodiment of the invention is shown which uses an analog meter 79 in place of the axial wear indicator 61. The output signal of the first comparator circuit 72 or the output signal of the second comparator circuit 74 are inputted to a combining circuit 78 comprising two diodes D1, D2. Then, the output signal of the combining circuit 78 is indicated on an axial wear indicator 79 such as an analog voltage meter. In this case, like the embodiment shown in FIG. 1, the dead zone circuit 77 allows the axial wear indicator 79 to remain deenergized over a range of axial displacement of the rotor 23 corresponding to the play of the rotor 23. However, it should be noted that the degree of bearing wear due to the axial displacement of the rotor 23 caused by bearing wear can be indicated but it cannot be determined whether the wear has happened on the front side bearing 28a or on the rear side bearing 28b. A simple direction-indicating addition may be sufficient to overcome this.

According to the canned motor axial bearing wear detector device of the invention, the dead zone circuit allows the wear indicators to remain unlit for the axial displacement of the rotor corresponding to the play of the rotor. Thus, the wear indicators are lit only for axial displacement of the rotor caused by bearing wear. Therefore, it is possible to determine whether the axial displacement of the rotor is within the range of play or whether there is bearing wear and clearly indicate the axial wear of the bearings.

The canned motor axial bearing wear detector device according to the invention has the following effect in addition to that described above: the first and second wear indicators are employed as the axial wear indicator, thereby making it possible to determine the amount and the direction of axial displacement of the rotor caused by bearing wear and to clearly indicate in the direction of the wear, and how excessive the wear is.

The canned motor axial bearing wear detector device according to the invention the following effect in addition to that described above: the LED bar graph is employed as the axial wear indicator. The number of LEDs illuminated is varied in response to the signal outputted from each of the comparator circuits of the dead zone circuit. This clearly indicates in which direction and how excessively the wear has occurred.

Although the problem of bearing wear detection is especially acute in canned motors, the present invention may be applied to other types of motors without departing from the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An axial bearing wear detector for motor comprising:

said motor being of a type having a rotor rotatable within a stator;

said rotor having a first amount of permitted axial motion in a first direction and a second amount of permitted motion in a second direction, motion exceeding said first and second amounts of axial motion reoresenting wear;

means for sensing a first axial position of said rotor in said first direction to produce a first axial position signal;

means for sensing a second axial position in said second direction to produce a second axial position signal;

first means for adjusting a first reference signal to a value related to said first axial position signal representing said first amount of permitted motion in said first direction;

first means for energizing a first wear indicator only when said first axial position signal exceeds said first reference signal whereby said first wear indicator is energized only when wear permits said axial position to exceed said first amount of permitted axial motion;

second means for adjusting a second reference signal to a value related to said second axial position signal representing said second amount of permitted motion in said second direction;

second means for energizing a second wear indicator only when said second axial position signal exceeds said reference signal whereby said second wear indicator is energized only when wear permits said axial position to exceed said second amount of permitted axial permit axial motion;

a dead-zone indicator; and means for energizing said dead-zone indicator only when neither said first wear indicator and said second wear indicator remain de-energized.

2. An axial bearing wear detector according to claim 1, wherein:

said first wear indicator includes at least a first two wear indicators; means for energizing a first of said first two wear indicators during bearing wear over a first range of axial motion in said first direction;

means for energizing a second of said first two wear indicators during bearing wear over a second range of motion in said second direction exceeding said first range of axial motion;

said second wear indicator includes at least a second two wear indicaors;

means for energizing a first of said second two wear indicators during bearing wear over a third range of axial motion in said second direction; and means for energizing a second of said second two wear indicators during bearing wear over a fourth range of axial motion in said second direction exceeding said third range of axial motion in said second direction.

3. An axial bearing wear detector according to claim 2, wherein said first two wear indicators said second two wear indicators and said dead zone indicator are LEDs

* * * * *